(12) United States Patent
Peng

(10) Patent No.: US 8,038,774 B2
(45) Date of Patent: Oct. 18, 2011

(54) SHIP FLUE GAS DESULPHURIZATION METHOD AND EQUIPMENT

(76) Inventor: Sigan Peng, Hongshen (CN)

( * ) Notice: Subject to any disclaimer, the term of this patent is extended or adjusted under 35 U.S.C. 154(b) by 0 days.

(21) Appl. No.: 12/304,752

(22) PCT Filed: Jun. 13, 2008

(86) PCT No.: PCT/CN2008/071307
§ 371 (c)(1),
(2), (4) Date: Apr. 5, 2010

(87) PCT Pub. No.: WO2009/149603
PCT Pub. Date: Dec. 17, 2009

(65) Prior Publication Data
US 2010/0206171 A1 Aug. 19, 2010

(51) Int. Cl.
*B01D 53/50* (2006.01)
*B01D 53/78* (2006.01)
(52) U.S. Cl. .......... 95/210; 95/229; 95/235; 96/244; 423/243.08
(58) Field of Classification Search .......... 95/210, 95/228, 229, 235, 263; 96/234, 244, 290; 423/242.1, 243.01–243.03, 243.08
See application file for complete search history.

(56) References Cited

U.S. PATENT DOCUMENTS

| | | | | |
|---|---|---|---|---|
| 3,285,711 A | * | 11/1966 | Stanford | 422/168 |
| 3,899,099 A | * | 8/1975 | Oiestad | 220/88.3 |
| 4,085,194 A | * | 4/1978 | Otani et al. | 423/243.03 |
| 4,197,278 A | | 4/1980 | Gehri et al. | |
| 4,337,230 A | * | 6/1982 | Ellestad et al. | 423/243.03 |
| 4,999,172 A | | 3/1991 | Simons | |
| 5,690,899 A | * | 11/1997 | Makkinejad et al. | 423/243.01 |
| 6,217,839 B1 | | 4/2001 | Hess et al. | |
| 6,284,208 B1 | * | 9/2001 | Thomassen | 423/210 |
| 6,402,816 B1 | | 6/2002 | Trivett et al. | |
| 6,726,748 B2 | | 4/2004 | Goode et al. | |

(Continued)

FOREIGN PATENT DOCUMENTS
CN 1236663 A 12/1999
(Continued)

OTHER PUBLICATIONS

Dr. Ida-Maja Karle, et al., "Seawater Scrubbing—Reduction of Sox Emissions from Ship Exhausts," The Alliance for Global Sustainability, Goteborg 2007, ISBN: 978-91-976534-1-1.

(Continued)

*Primary Examiner* — Frank Lawrence, Jr.
(74) *Attorney, Agent, or Firm* — Nixon Peabody LLP; Joseph Bach, Esq.

(57) ABSTRACT

This invention involves ship flue gas desulphurization method and system. It employs seawater to reduce $SO_2$ and other pollutant discharged by ship. The method includes seawater scrub, acidic seawater transfer, deacidification, and discharge processes. The system includes a scrubber and a water-saving deacidification device. Upper portion of the scrubber comprises a scrubbing section which is connected with scrubbing seawater pump by pipelines. Lower portion of the scrubber comprises a cooling section. One end of the scrubber links the ship engine smoke pipe by a scrubbing inlet pipe, and the other end links the scrubber to a scrubbing outlet pipe. The water-saving deacidification device lies below the scrubber and is connected with it. The water-saving deacidification device is coupled to a blending seawater pump, fan, and total drain pipe for discharging seawater after deacidification. This invention provides high desulphurization efficiency, and requires small seawater quantity.

15 Claims, 5 Drawing Sheets

U.S. PATENT DOCUMENTS

| | | | |
|---|---|---|---|
| 7,056,367 B2 | 6/2006 | Trivett | |
| 2006/0251559 A1* | 11/2006 | Schleicher et al. | 423/243.03 |
| 2008/0044335 A1* | 2/2008 | Anttila et al. | 423/243.01 |
| 2009/0257932 A1* | 10/2009 | Canari et al. | 423/212 |

FOREIGN PATENT DOCUMENTS

| | | | |
|---|---|---|---|
| CN | 1262145 A | | 8/2000 |
| CN | 1365846 A | | 8/2002 |
| CN | 1839101 A | | 9/2006 |
| CN | 2912777 Y | | 6/2007 |
| CN | 101104130 A | | 1/2008 |
| CN | 101115542 A | | 1/2008 |
| CN | 201058282 Y | | 5/2008 |
| CN | 101314106 A | | 12/2008 |
| EP | 1857169 A1 | | 11/2007 |
| WO | WO 99/44722 | * | 9/1999 |
| WO | WO 2006/018911 A1 | * | 2/2006 |
| WO | WO 2008/029397 A1 | | 3/2008 |
| WO | WO 2008/029398 A1 | | 3/2008 |
| WO | WO 2009/149602 A1 | | 12/2009 |

OTHER PUBLICATIONS

International Search Report for PCT/CN2008/071307 dated Mar. 26, 2009.

* cited by examiner

SHIP FLUE GAS DESULPHURIZATION METHOD AND EQUIPMENT

FIELD OF INVENTION

This invention involves method and system for ship flue gas desulphurization. It employs seawater to remove $SO_2$ and other pollutants in ship exhaust. It falls into the following fields: atmosphere environmental protection, ocean resources development and utilization, and prevention and control of shipping exhaust pollutant.

TECHNOLOGY BACKGROUND

The problem of reduction in shipping generated $SO_2$ is getting more serious and drawing people's attention world widely as related legislation is getting stricter. Shipping is an industry that correlates to the global economy, and in which a large amount of ships are equipped with oil-based fuel engines. Completely relying on using low-sulfur fuel oil may lead to dramatically rising cost. Hence providing shipping industry with economical flue gas desulphurization technology seems to be imperative.

Under mobile condition in different sea areas and with gas temperature as high as 200° C. to 490° C., compared to land fossil fuel fired industrial facility, the ship FGD technology must consider its practicality based on economic cost concern. Instead, it requires the total cost of ship FGD facility including manufacture cost and running cost to be significantly lower than the total saving cost of using low-sulfur fuel for substitute.

As a result, the IMO (International Maritime Organization) published the ship desulphurization regulation in 2005. Soon, the potential economic advantage of seawater FGD technology was recognized. In 2007, a research carried by scholars from four well known universities reached the conclusion: using the ocean resource, that is, the seawater, to realize ship $SO_2$ reduction is a goal that people have pursued but have not realized.

The Alliance for Global Sustainability of four universities (Massachusetts Institute of Technology, University of Tokyo, Chalmers University of Technology, Swiss Federal Institute of Technology Zurich) published: "Seawater Scrubbing—reduction of SOx emissions from ship exhausts," which points out: "It is shown that seawater scrubbing is a promising technology for reducing sulphur oxide emissions from ships . . . would therefore require detailed case studies . . . . Further studies would be needed in order to assess these options."

Existing technologies that apply seawater scrubbing method to reduce ship exhaust are:

1. "A seawater scrubbing ship exhausts processing method" (Patent number 200710012371.1, published in China, Jan. 16, 2008). It uses a hollow fiber contactor as scrubber, and in this scrubber the ship exhaust undergoes dust removal and thereafter is scrubbed with seawater. The process is monitored by control system that includes an $SO_2$ consistency sensor, water quality sensor, and PLC programming controller. The system may monitor and record the real-time $SO_2$ consistency in processed ship exhaust, monitor and record discharged water quality, and control the water discharge, respectively. However, it has the problems described below:

1) The technology uses a hollow fiber contactor as scrubber. This hollow fiber contactor only tolerates decades of centigrade. It can not be used for high-temperature gas, especially for the ship engine exhaust with temperature as high as 200-490° C.

2) At the same time, pressure drop and resistance are very high when the hollow fiber contactor is used for scrubbing. Operation cost and energy expenditure would be quite high if additional booster fan is installed.

2. 'Seawater Scrubbing—reduction of SOx emissions from ship exhausts' (ISBN: 978-91-976534-1-1, American, 2007): "It is shown that seawater scrubbing is a promising technology for reducing sulphur oxide emissions from ships. Based on a 12 MW engine burning fuel with a 3% sulphur content. Calculations have been made for different efficiencies of sulphur scrubbing, different water temperatures, and for six different water types. The results of the calculations give the volumes of water required for (i) uptake of SOx (the scrubbing process), (ii) dilution of the scrubbing water to achieve a pH of 6.5, (iii) further dilution to achieve a pH within 0.2 units of that in the ambient water, and no more that a 1% reduction in dissolved oxygen concentration. The volumes of water required for a given efficiency of the scrubbing process . . . would require significantly larger water volumes for scrubbing and dilution . . . would therefore require detailed case studies. It may be possible to reduce the volumes of dilution water required by, for example, aeration of the scrubbing water and addition of base to neutralize the acidic sulphur oxides. Further studies would be needed in order to assess these options."

The research is representative one in the seawater scrubbing method field for marine ship $SO_2$ reduction. However, it remains in the stage of principle. It still fails to solve some problems: low absorb efficiency, large diluting water volume. To protect the environment from discharged water pollutant, EPA and IMO have passed regulations regarding the blending of discharged water with surrounding seawater. The blending process is defined as quick blending area and slow blending area. The boundary pH value is 6.5 for quick blending area, and 15 minutes is the time limitation for this value to be reached. For the slow blending area, the difference of boundary pH value and surrounding seawater pH value must less than 0.2. The report is carried based on a 12 MW engine. In order to fulfill the requirements regarding gas and discharge water, the ship must prepare thousands of tons of seawater per hour. Seawater needs further dilution after discharged from the ship and further blending with surrounding seawater that is not less than 40000 times of its volume.

This research has not mentioned the application of both technology and facility design.

3. Ecosilencer Exhaust Gas Cleaning Presentation (February 2006, Canada): Introduced EcoSilencer method seawater scrubbing system and equipment (FIG. 5). This technology experimented for more than 6 years until 2006. Core components correspond to the disclosure in U.S. Pat. No. 7,056,367: "Method and Apparatus for Scrubbing Gases Using Mixing Vanes" (FIG. 4).

The high-temperature gas from the engine must be cooled so that $SO_2$ can be absorbed. For this reason, the scrubber of this invention (U.S. Pat. No. 7,056,367) adopts 'exhaust gas inlet to liquid scrubbing tank,' that is, the bubbling scrubbing method. However, the high-temperature gas cooling process and scrubbing process are carried out in the same tank at the same time. Hence, the transfer efficiency is quite low; in addition, the two processes conflict. In order to increase scrubbing efficiency under such condition, the only way is to increase the volume of scrubbing water and reduce pressure, which subsequently causes significant energy consumption and increase in operational cost. It seems to that the problems of a seawater scrubbing system that adopt this scrubber are caused by the conflict of cooling the high-temperature gas and absorbing $SO_2$ at low-temperature, as well as the conflict of the scrubbing efficiency and reducing cost.

In conclusion, current research and experimental technology must confront similar issues when it comes into the practical field:

1) It is presently difficult to meet the environmental requirements of gas exhaust and seawater discharge under acceptable cost; energy consumption and operating costs are both very high to meet discharging water regulation because of the large volume of scrubbing water and diluting water; the cost will increase if higher requirements for discharging water are published in the future.

2) Unsuitable for mobility of ship. Different sea areas and controlling areas have different environmental conditions and governmental control requirements. Conditions change consistently for marine ship sailing between different sea areas and controlled areas. For example: seawater quality, sulphur content in different batches of fuel, discharging regulation in different environments, and other circumstances. It appears that flue gas desulphurization technologies with fixed parameters cannot be applied for ships.

Apparently, the expectation that using marine resource to eliminate air pollutant will not be realized if the mentioned problems remain unsolved.

SUMMARY

To comply with the laws and regulations regarding ship flue desulphurization, practical ship $SO_2$ reduction method and systems using seawater must be developed so that the expectation of using marine resources to eliminate ship atmospheric pollution can be realized.

A first aspect of this invention is to overcome the shortcomings of existing ship flue gas desulphurization (FGD) methods, and to provide a ship gas desulphurization method which offers high desulphurization efficiency, consumes less scrubbing and diluting seawater, expends low energy and cost, and has the ability to adapt in different sea areas and controlling areas.

A second purpose of this invention is to overcome shortcomings of existing ship gas desulphurization facilities, and to provide a ship gas desulphurization system which offers high desulphurization efficiency, consumes less scrubbing and diluting seawater, costs less for manufacturing and operating, has small volume, is durable, and is suitable for ships which have limited usable space and large sailing area.

In one embodiment, a FGD method comprises the following steps:

A) cooling, followed by scrubbing, of high-temperature flue gas containing $SO_2$ from ship engine, wherein said scrubbing is done with seawater in a scrubber, and then discharging the scrubbed clean gas;

B) transferring acidic seawater formed during the scrubbing process due to the absorption of $SO_2$ to a water-saving deacidification device;

C) blending acidic seawater in the water-saving deacidification device with alkaline seawater, thereby making mixed seawater, and aerating the mixed seawater; and D) discharging the mixed seawater after deacidification once the mixed seawater is deemed suitable for discharging into the sea.

The scrubbing step uses seawater in the scrubber, where scrubbing is done in the scrubber at a packing scrubbing section.

The deacidification includes blending alkaline seawater into the water-saving deacidification device, wherein a flow of the alkaline seawater is regulated by a first regulator that regulates the flow by opening adjustable valves and/or output adjustable pumps; and wherein a flow of air that is blown into the water-saving deacidification device in the aeration process is regulated by a second regulator that regulates the flow by opening adjustable valves, dampers and/or adjustable fans.

In the scrubbing step of this ship FGD method, the flow of scrubbing seawater is regulated by a regulating means. The regulating means regulates the flow by opening adjustable valves and/or output adjustable pumps.

The regulating of this ship FGD method employs means to regulate flue gas emission and seawater discharge according to environmental requirements of the sailing area of the ship. The regulating is done manually and/or by a desulphurization controller.

There may be an impurity separating process between scrubbing and deacidification. The separating process means first separates impurities by a separator and then discharges through a waste outlet.

An FGD system according to this invention comprises a scrubber and a water-saving deacidification device. Upper part of said scrubber comprises a packing scrubbing section and is connected with scrubbing seawater pump by pipelines; the lower part of the scrubber is the cooling section. One end of the scrubber links the ship engine smoke pipe by a scrubbing inlet pipe and the other end links a scrub outlet pipe. The water-save acid removal, or deacidification, device lies below the scrubber and is connected with it. The water-saving deacidification device connects to a blending seawater pump, a fan, and a total drain pipe to discharge post-deacidification seawater that is suitable for discharge.

In one embodiment of the ship FGD system, there exists a blending alkaline seawater passage on the water-saving deacidification device, at which an alkaline seawater flow regulator is installed. The flow regulator is selected from an opening adjustable valve or/and an output adjustable pump. The water-saving deacidification device may also comprise an air inlet passage, at which an air flow regulator is installed. The air flow regulator is selected from an opening adjustable valve, dampers or/and an output adjustable fan.

In an embodiment of the ship FGD system, there exists a scrubbing seawater passage on said scrubber, at which scrubbing seawater flow regulator selected from an opening adjustable valve or/and output adjustable pump is installed.

The valve and/or dampers may comprise levers; the pump and fan may comprise electrical speed governor; the lever and electrical speed governor may be coupled to a desulphurization controller.

In one embodiment, the scrubber comprises a shell, a cooling section, packing scrubbing section, and a water tank, wherein the cooling section is situated under packing scrubbing section.

Further, the ship FGD system may include an impurity separator installed between scrubber and water-saving deacidification device.

In one embodiment of the FGD system, the desulphurization controller comprises commanding apparatus, sensor, central processing unit (CPU), actuator, and global sea area position system.

Persons skilled in the art will appreciate that the invention is not limited by the embodiments disclosed herein, and further embodiments are possible without departing from the scope of the present invention.

BRIEF DESCRIPTION OF THE DRAWINGS

The accompanying drawings, which are incorporated herein and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

In FIG. 3, air inlet 3.4 leads high-temperature gas into scrubber 3 from the bottom. This system is suitable for situations where the flue gas enters the scrubber vertically from the bottom.

The name of components or structures corresponding to the figure number are:
FIGS. 1 and 2: 1—Ship engine, 2—Scrub inlet pipe, 3—Scrubber; 4—Scrub outlet pipe, 5—Scrubbing seawater pump, 6—Scrub speed governor, 7—Seperator, 8—Seperator drain tube, 9—Blending seawater pump, 10—Water-save acid removal device, 11—Fan, 12—Exhaust pipe, 13—Total water inlet pipe, 14—Total drain pipe, 15—Desulphurization controller;
FIGS. 3 and 4: 3.1—Shell, 3.2—Cooling section, 3.3—packing scrubbing section, 3.4—Gas entrance, 3.5—Discharge clean gas, 3.6—Scrubbing seawater inlet pipe, 3.7—Water tank;
FIG. 5: 15.1—Commanding apparatus, 15.2—Sensor, 15.3—Central processing unit (CPU), 15.4—Actuator, 15.5—Global sea area position system.
FIG. 6: 16.1—Scrub and re-heat the exhaust, 16.2—Scrub exhaust re-heating area, 16.3—Mixing exhaust and seawater in the scrubber, 16.4—Seawater entrance, 16.5—Seawater transferring to the separator and the heat interchanger, 16.6—Exhaust emission, 16.7—Seperator and filter, 16.8—Discharge clean water, 16.9—Discharge mud.

DETAILED DESCRIPTION

Figure 1:
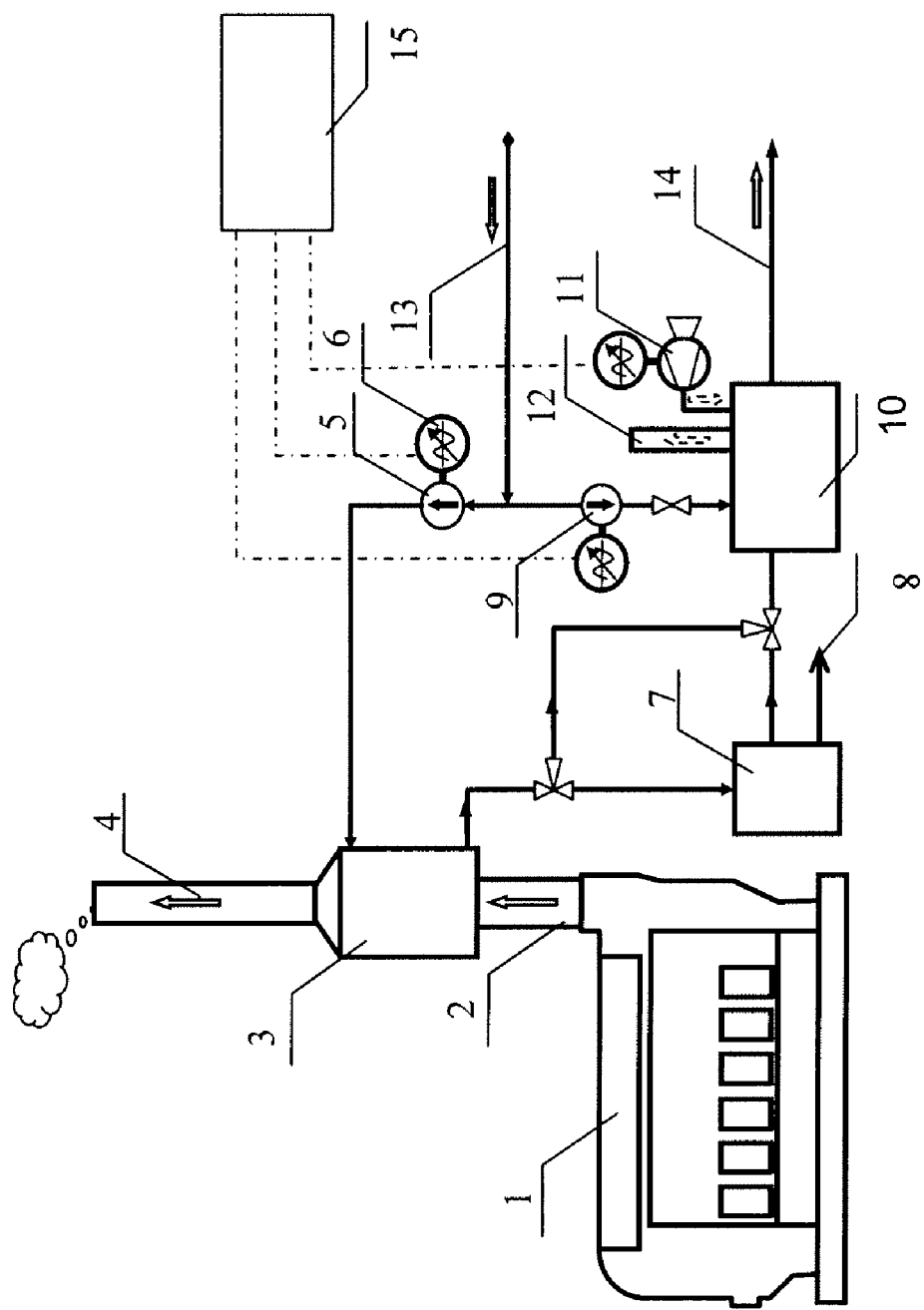
FIG. 1 shows a FGD system, according to an embodiment of the present invention. This system has a desulphurization controller.

Technical principle and overall effect of the ship FGD method and ship FGD system of this invention are described below.

Technical principle: Main functions of the ship FGD method and system, as well as problems for them to solve comprise: scrubbing and absorbing, water discharging, and mobile sailing.

1) Scrubbing and absorbing: Seawater scrubbing is employed in order to remove $SO_2$ and other pollutant in ship exhaust that are emitted from the engine. Seawater has strong dissolving and absorbing ability for $SO_2$ because of its physical and chemical characteristics, At the same time, seawater can scrub and absorb nitrogen oxide and particulate well. Ships typically have a limited usable space, consequently the FGD system has to be small. This means that the absorbing process must take less time than in larger system; hence the scrubbing and absorbing must be completed in a very short time. It means that the FGD system not only must possess very high total absorbing efficiency, but also have very high absorbing speed and the scrubbing must be extremely efficient and effective. For the above reasons, the powerful dissolving and absorbing quality of seawater must be coordinated with a powerful transfer process which passes the pollutants from flue gas to the liquid seawater. On the other hand, the temperature of diesel motor exhaust could be as high as 490° C. Both for $SO_2$ removal or for system protection, the high-temperature flue gas must to be cooled before entering the scrubbing step. To address this, the scrubbing process of this invention employs a counter-flow packing scrubber. The highly efficient ship FGD method and system disclosed in this invention make scrubbing and cooling take place at different times, using seawater as scrubbing material. The functional section of the scrubber comprises filling section. The scrubbing seawater is distributed to the filling material evenly by a water distributor from above; the high-temperature gas is cooled and then passes the filling material starting from a bottom end and going upwards; the scrubbing seawater, on the other hand, passes the filling material starting from the top, and going downwards. Because of the huge surface area formed by the fillings, gas and liquid are provided with a huge contact area; hence the transferring ability and absorbing ability are increased. An aim of this invention is to achieve highly efficient desulphurization. The filling method can significantly reduce resistance for the passing gas to realize high scrubbing absorbing ability and low operating cost.

2) Water discharging: Seawater which is used for scrubbing has dissolved $SO_2$ and is acidic, and it has to be discharged into the ocean after pH raising treatment. Existing technologies employ simple dilution method which consumes large diluting water volume and causes high energy consumption and cost. To overcome these shortcomings, this invention introduces water-saving deacidification device to decrease the diluting water volume. $SO_2$ dissolves in scrubbing seawater and turns to $SO_3^{2-}$ and other acidic materials; they then turn to carbonic acid and other acid materials when fresh alkaline seawater is blended in. A conventional diluting process requires huge volume of diluting water because the pH value rises slowly. In the water-saving deacidification device of this invention, fresh alkaline seawater is blended in simultaneously with air. This makes the carbonic acid volatile quickly and the pH value of scrubbing seawater rises rapidly, so the required volume of diluting water is reduced.

3) Mobile adjustment. Marine ship regularly sails in different sea areas, thus, it faces changing conditions such as seawater quality in different sea areas, sulphur content of different batches of fuel, discharging regulation in different environments. Therefore, technologies with fixed parameters cannot be employed on marine ships. This invention adjusts scrubbing seawater flow, blending seawater flow to the water-saving deacidification device, and air flow to the water-saving deacidification device. It also uses controller including CPU to monitor the above described adjustments. Thus, the FGD method and system of this invention are very applicable for marine ship which always moves.

FGD method and system of this invention conform to environmental protection laws and regulations. Technical advantages offered by the methods and systems of the present invention are significant.

Firstly, the methods and systems are highly efficient in pollutant reduction. It can reduce 99% oxysulfide, 20% oxynitride, and 80% particles. It has important significance to the environmental objectives of international shipping businesses. IMO published restrictions for SECA (SOx Emission Control Area) that the sulphur content of fuel oil used on board ships must not exceed 1.5%. Alternatively, ships must fit an exhaust gas cleaning system to make the sulphur content of exhaust emissions equal to the case when ships use fuel oil with sulphur content not exceed 1.5%, that is, the 'desulphurized equivalent fuel oil sulphur content' must not exceed 1.5%. Other international organizations are pursuing a 0.1% fuel oil sulphur content goal. Currently, global average sulphur content of heavy oil is approximately 3%, so the scrubbing efficiency must be 50% to reach the desulphurized equivalent fuel oil sulphur content 1.5% goal, and 96.7% to reach the desulphurized equivalent fuel oil sulphur content 0.1% goal.

Secondly, the systems and method of the present invention demonstrate that they can offer excellent desulphurization result and environmental protection performance when moving between different sea areas where the seawater quality, fuel sulphur content, and environmental restriction vary constantly.

Thirdly, the discharged water of this invention is environmentally friendly. As mentioned previously, the EPA and the IMO mandate that ships' discharge water must meet the boundary pH value, so as to reach 6.5 for quick blending area within 15 minutes. Method and system of this invention enable the pH value of discharge water to reach 6.5 before discharge; as a result, the quick blending area is not even needed. The harmful effect to the ocean for 15 minutes is eliminated completely at the very first step. On the other hand, the diluting rate in slow blending area can be decreased to 1:2000 from 1:40000. Compared to existing technologies, merely 1/20 surrounding seawater is needed to blend. Slow blending area is reduced significantly and the discharged water is much more environmentally friendly.

Fourthly, it decreases the manufacture and operating costs by many ways, including reducing the energy consumption and seawater volume; it produces outstanding economic result in that the total cost is significantly lower than the cost of using low sulphur fuel.

Applications:

Further description of the ship FGD methods and systems by figures and examples is given below.

A: Examples of Ship FGD Method

Example 1

As shown in the embodiment illustrated in FIG. 1, this example method involves a desulphurization controller. The ship FGD method of this example comprises the following steps:

a. Scrubbing: Cool and then scrub the high-temperature flue gas that contains $SO_2$ from ship engine, and discharge the scrubbed clean gas after scrubbing. The scrubbing step uses seawater in the scrubber.

b. Acidic seawater transfer: Transfer acidic seawater formed in the scrubbing process which absorbs $SO_2$ to water-saving deacidification device;

c. Deacidification: Blend acidic seawater in the water-saving deacidification device with alkaline seawater so as to form mixed seawater, and aerate the mixed seawater;

d. Discharge: Discharge the mixed seawater after deacidification that is suitable for discharge into the sea; The scrubbing step is using seawater in the scrubber, where the scrubbing is performed in a packing scrubbing section.

In order to adapt to changing conditions as the ship usually sails between different sea area, for example seawater quality, sulphur content of different batches of fuel, discharging regulation in different countries and areas, the deacidification process uses water-saving acid removal device to blend alkaline seawater in. The alkaline seawater flow is regulated by a regulator; the regulating is carried by output adjustable pumps, or opening adjustable valves, or the combination of output adjustable pumps and opening adjustable valves. Air blown into the mixed seawater in the water-saving deacidification device is regulated by a regulator; the regulating is carried out by output adjustable fan, or opening adjustable valves or dampers, or the combination of valves and fans, or the combination of dampers and fans. The scrubbing seawater flow in the scrubbing process is regulated by a regulator; the regulating is carried out by output adjustable pumps, or opening adjustable valves, or the combination of opening adjustable valves and output adjustable pumps; the regulating is controlled by the desulphurization controller according to different environmental requirements in different sea areas for exhaust emission and seawater discharging; manual regulating is another application example. There may exist an impurity separation step between the scrub and deacidification processes; the separating process first separating impurities by a separator and then discharges through waste outlet.

The example shows a ship with 12 MW diesel fuel engine, exhaust gas at 200-490° C., and exhaust volume approximately 67,095 $Nm^3/h$. Under the 3% fuel oil sulphur content condition, adopting desulphurization method of this invention enables the desulphurized equivalent fuel oil sulphur content to reach 0.1%, and discharging water at $pH \geqq 6.5$. The seawater consumption in different sea areas:

the Baltic Sea scrubbing seawater 300 $m^3/h$ blending seawater 1100 $m^3/h$ the North Sea scrubbing seawater 280 $m^3/h$ blending seawater 950 $m^3/h$ Example 2

Figure 2:
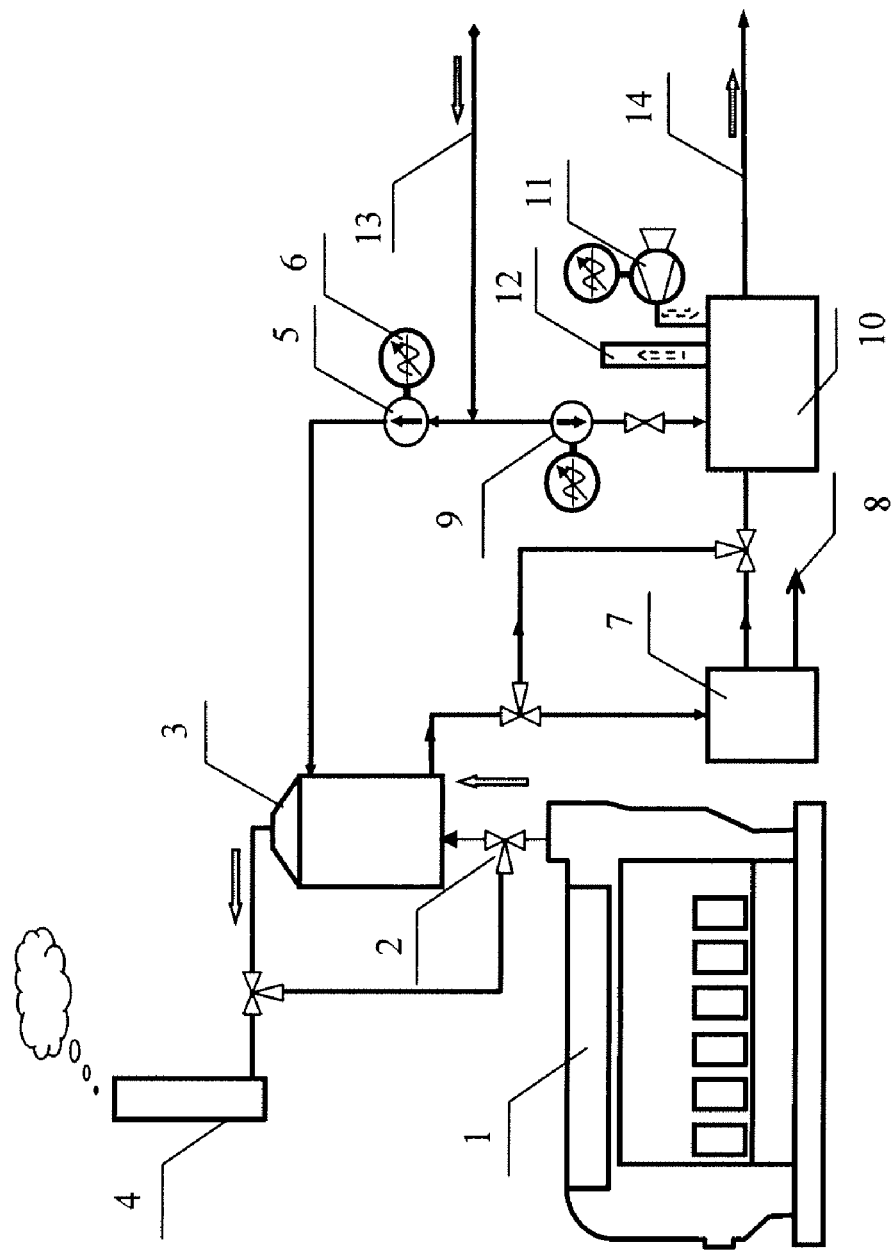
FIG. 2 shows another embodiment of the FGD system of the present invention. This system has no desulphurization controller. Scrubber 3 has a bypass smoke pipe, and it is used to directly link the smoke pipe between the ship's engine and the scrubbing outlet pipe; The flue gas can be discharged from the bypass.

The Example embodiment of FIG. 2 is slightly different from the example of the embodiment illustrated in FIG. 1. The scrubber 3 in FIG. 2 has a bypass smoke pipe, and it is used to directly link smoke pipe between ship engine and scrub outlet pipe. The flue gas can be discharged from the bypass. The desulphurization control is completed manually.

This example is applied to large tonnage ships having 60 MW diesel fuel engine, exhaust gas 200-430° C., and exhaust volume approximately 310,100 $Nm^3/h$. Under the 3% fuel oil sulphur content condition, adopting the desulphurization method of this invention enables the desulphurized equivalent fuel oil sulphur content to fulfill SECA standard (2005), that is 1.5%, and the discharging water at $pH \geqq 6.5$. The seawater consumption in different sea areas:

the Baltic Sea scrubbing seawater 980 $m^3/h$ blending seawater 3600 $m^3/h$ the North Sea scrubbing seawater 880 $m^3/h$ blending seawater 2600 $m^3/h$ B: Examples of Ship FGD System:

Example 3

Figure 3:
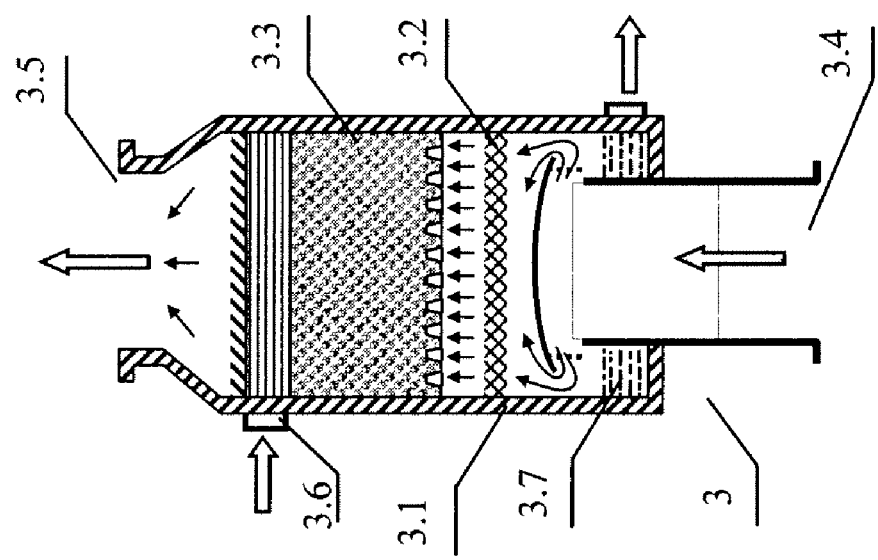
FIG. 3 shows an example structure for the scrubber 3 of the FGD system according to the present invention.
Figure 5:
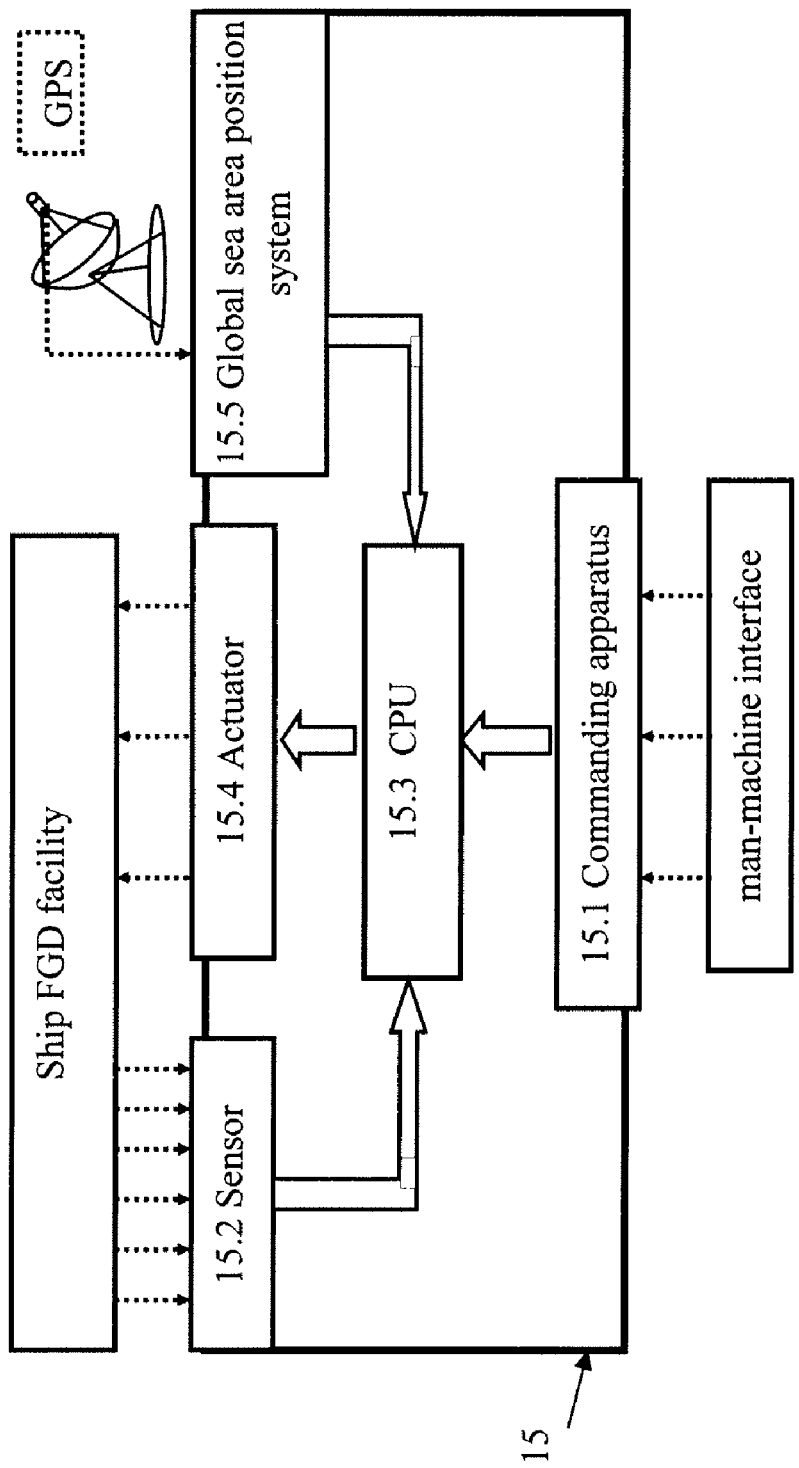
FIG. 5 shows a block diagram of the desulphurization controller of the FGD system, according to an embodiment of the present invention.
Figure 6:
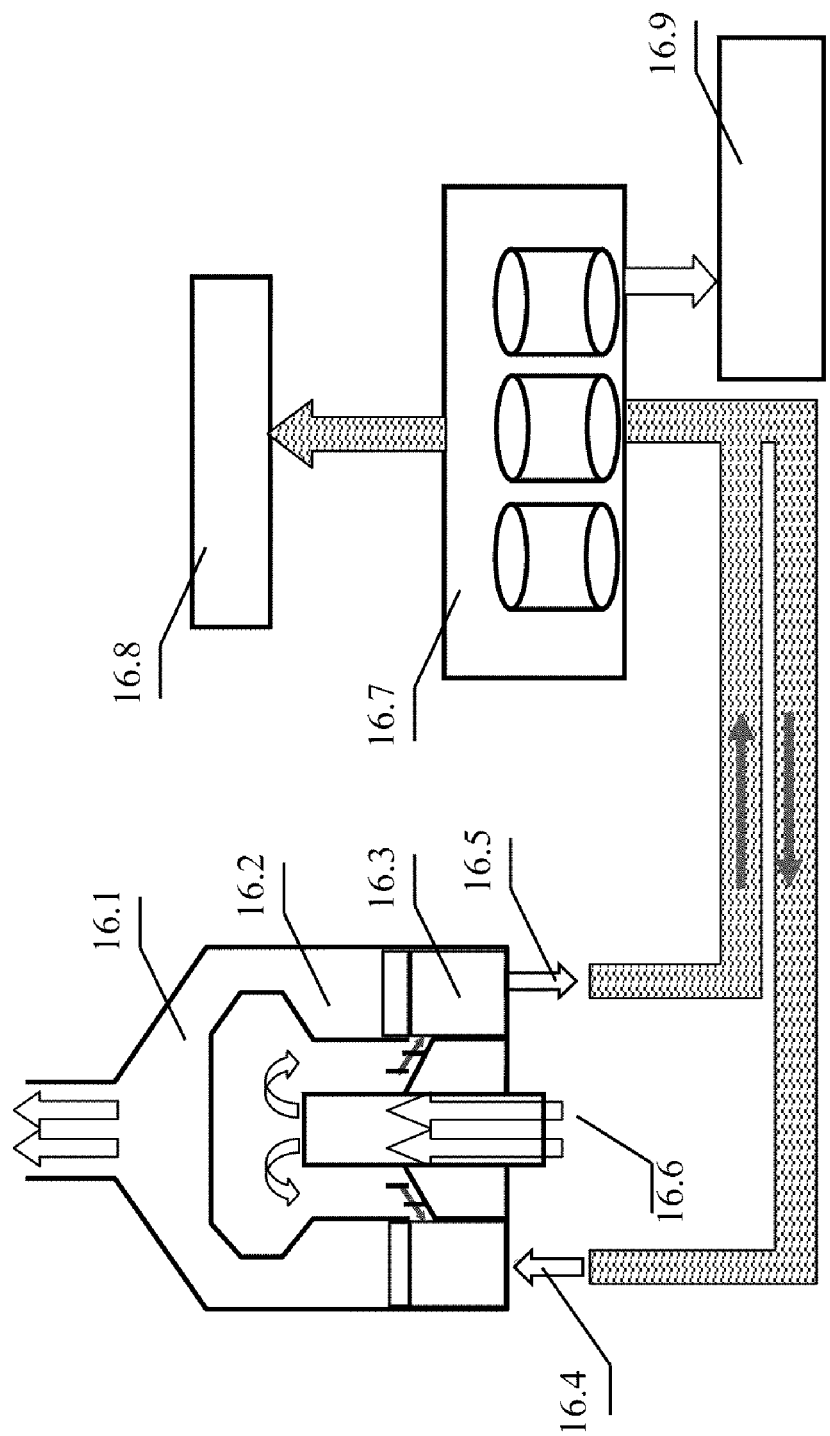
FIG. 6 shows an existing system, the EcoSilencer sea water scrubbing system. Its scrubber uses an embedded in-line inlet pipe, heat pipe, exhaust pipe, reverse exhaust, and scrubbing liquid tank; the end of the heat pipe and exhaust pipe are linked and immerse in the scrubbing liquid, and the heat pipe has radial cross section to increase the heat diffusion area, so that generates more heat to discharge emission; the goal is to increase the exhaust temperature, it must be at least 30° C. higher than the dew point.

FIGS. 1 and 3 depict a ship FGD system used to apply FGD method described above. Scrubber 3 is installed with an air inlet 3.4 which leads high-temperature gas into scrubber 3 from the bottom. It is suitable for situations where the flue gas enters the scrubber vertically from the bottom and flows upwards. A ship FGD system comprises scrubber 3 and water-saving deacidification device 10. Upper part of the scrubber 3 is the packing scrubbing section 3.3 and is connected with scrubbing seawater pump 5 by pipelines; lower part of the scrubber is the cooling section 3.2. One end of the scrubber 3 links the ship engine 1 smoke pipe by scrubbing inlet pipe 2 and the other end links scrub outlet pipe 4. Water-saving deacidification device 10 is positioned below scrubber 3 and is connected with it. Water-saving deacidification device 10 connects with blending seawater pump 9, fan 11, and total drain pipe 14 for discharging seawater after acid removal treatment. A blending alkaline seawater passage on the water-saving deacidification device 10 has an alkaline seawater flow regulator installed. The flow regulator is selected from output adjustable pump or opening adjustable valve, or the combination of output adjustable pump and opening adjustable valve. An air inlet on the water-saving deacidification device 10 has an air flow regulator installed. The air flow regulator is selected from output adjustable fan or opening adjustable valve or board, or the combination of output adjustable pump and opening adjustable valve, or the combination of valves and fans, or the combination of boards and fans. A scrubbing seawater passage on the scrubber 3 has a scrubbing seawater flow regulator installed. The scrubbing seawater regulator is selected from opening adjustable valve or output adjustable pump, or the combination of valve and output adjustable pump. In the ship FGD system, valve and damper may be installed with lever, and the pump and fan may be installed with electrical speed governor. Said lever and electrical speed governors are connected with a desulphurization controller 15. Said scrubber 3 comprises a shell 3.1, a cooling section 3.2, a packing scrubbing section 3.3, and a water tank 3.7. Cooling section 3.2 lies under packing scrubbing section 3.3. An impurity separator 7 is installed between scrubber 3 and water-saving deacidification device 10. Said desulphurization controller 15 may comprise a commanding apparatus 15.1, sensors 15.2, central processing unit (CPU) 15.3, actuators 15.4, and a global sea area position system 15.5.

Example 4

Figure 4:
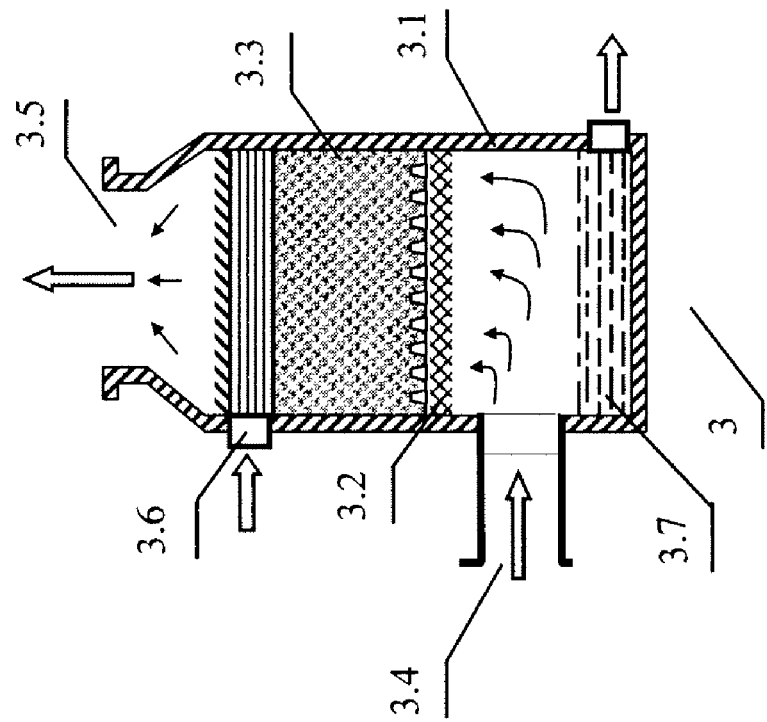
FIG. 4 shows another example structure for the scrubber 3 of the FGD system according to the present invention. In this case air inlet 3.4 leads high heat gas into scrubber 3 from its side board at the lower end. This configuration is suitable for situations where the flue gas enters the scrubber horizontally and then goes upside vertically.

FIG. 4 demonstrate another ship FGD system application for the FGD method described in this invention. The difference with the example 3 is that high-temperature gas enters the scrubber 3 horizontally from its side gas inlet 3.4. It is suitable for situations where the flue gas enters the scrubber horizontally and then goes vertically upside. Moreover, the desulphurization control is done manually.

The protection range of this invention is not limited by examples above. It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. A ship flue gas desulphurization (FGD) method using seawater, comprising:
    A) flowing the ship flue gas through a cooling section and thereby cooling the high-temperature flue gas, followed by scrubbing flue gas containing $SO_2$ from ship engine to thereby obtains scrubbed clean gas, wherein said scrubbing is done with seawater and in a scrubber, and discharging the scrubbed clean gas; separating impurity from acidic seawater formed during the scrubbing process due to the absorption of $SO_2$, and discharging the impurity through a waste outlet;
    B) transferring said acidic seawater after separating the impurity to a water-saving deacidification device;
    C) blending acidic seawater in the water-saving deacidification device with alkaline seawater, making mixed seawater, and aerating the mixed seawater; and
    D) discharging the seawater after deacidification once the seawater is deemed suitable for discharging into the sea.

2. The ship FGD method of claim 1, wherein the scrubbing in step A) using seawater in the scrubber comprises scrubbing in a packing scrubbing section of the scrubber.

3. The ship FGD method of claim 1, wherein the deacidification process in sep C) includes blending alkaline seawater into the water-saving deacidification device, wherein a flow of the alkaline seawater is regulated by a first regulating means that regulates the flow by opening adjustable valves and/or output adjustable pumps; and wherein a flow of air that blown into the water-saving deacidification device in the aeration process in step C) is regulated by a second regulating means that regulates the flow by opening adjustable valves, dampers and/or adjustable fans.

4. The ship FGD method of claim 1, wherein a flow of scrubbing seawater in said scrubbing process in step A) is regulated by a third regulating means that regulates the flow by opening adjustable valves and/or output adjustable pumps.

5. The ship FGD method of claim 3, wherein regulating means are employed to regulate flue gas emission and seawater discharge according to environmental requirements of sailing areas of the ship, wherein the regulating means comprise a manual controller and/or a desulphurization controller device.

6. The ship FGD method of claim 4, wherein regulating means are employed to regulate flue gas emission and seawater discharge according to environmental requirements of sailing areas of the ship, wherein the regulating means comprise a manual controller and/or a desulphurization controller device.

7. A ship FGD system that uses the FGD method in claim 1, wherein the system comprises:
    a scrubber, wherein an upper part of the scrubber comprises a packing scrubbing section which is connected to a scrubbing seawater pump by pipelines, and a lower part of the scrubber comprises a cooling section, and wherein one end of the scrubber is coupled to a ship engine smoke pipe through a scrubbing inlet pipe, and an opposite end of the scrubber is coupled to a scrub outlet pipe; and a water-saving deacidification device coupled to the scrubber; wherein the water-saving deacidification device is coupled to a blending seawater pump, a fan, and a total drain pipe for discharging seawater that is suitable for discharge after deacidification; and an impurity separator installed between the scrubber and the water-saving deacidification device for separating impurity from acid seawater from the scrubber.

8. The ship FGD system of claim 7, wherein the said water-saving deacidification device further comprises:

a blending alkaline seawater passage having an alkaline seawater flow regulator installed therein, wherein the alkaline seawater flow regulator comprises one or more of an opening adjustable valve and an output adjustable pump; and an air inlet passage having an air flow regulator installed therein, wherein the air flow regulator comprises one or more of an opening adjustable valve, a damper, and an output adjustable fan.

9. The ship FGD system of claim 7, wherein the scrubber further comprises a scrubbing seawater passage having a scrubbing seawater flow regulator installed therein, wherein the scrubbing seawater flow regulator comprises one or more of an opening adjustable valve, and an output adjustable pump.

10. The ship FGD system of claim 8, wherein the opening adjustable valves and the damper comprise levers, and the output adjustable pump and the output adjustable fan comprise electrical speed governors, wherein said levers and electrical speed governors are coupled to a desulphurization controller.

11. The ship FGD system of claim 9, wherein the opening adjustable valve comprise levers, and the output adjustable pump comprise electrical speed governors, wherein said levers and electrical speed governors are coupled to a desulphurization controller.

12. The ship FGD system of claim 7, wherein the scrubber comprises:

a shell housing the packing scrubbing section and the cooling section, wherein the cooling section is located under the packing scrubbing section; and a water tank.

13. The ship FGD system of claim 10, wherein the desulphurization controller comprises a commanding apparatus, one or more sensors, a central processing unit (CPU), one or more actuators, and a global sea area position system.

14. The ship FGD system of claim 11, wherein the desulphurization controller comprises a commanding apparatus, one or more sensors, a central processing unit (CPU), one or more actuators, and a global sea area position system.

15. A ship flue gas desulphurization (FGD) method for scrubbing high temperature ship flue gas containing $SO_2$ from ship engine using seawater, comprising:

using water distributor to distribute sea water over filling material in counter-flow scrubbing and cooling sections, wherein the sea water passes filling material in the scrubbing and cooling sections starting from the top and flowing downwards, wherein the cooling section is positioned below the scrubbing section;

cooling the ship flue gas by flowing the gas through the filling material in the cooling section and thereafter scrubbing the flue gas by flowing the gas through filling material in the scrubbing section, to thereby obtain scrubbed clean gas;

discharging the scrubbed clean gas;

transferring acidic seawater formed during the scrubbing process due to the absorption of $SO_2$ to a water-saving deacidification device;

blending acidic seawater in the water-saving deacidification device with alkaline seawater, making mixed seawater, and aerating the mixed seawater; and discharging the seawater after deacidification once the seawater is deemed suitable for discharging into the sea.

\* \* \* \* \*